(12) United States Patent
Irschick et al.

(10) Patent No.: US 10,218,965 B2
(45) Date of Patent: Feb. 26, 2019

(54) MULTIPLE CAMERA PHOTOGRAMMETRY SYSTEM

(71) Applicant: University of Massachusetts, Boston, MA (US)

(72) Inventors: Duncan J. Irschick, Amherst, MA (US); Dylan R. Briggs, Shrewsbury, MA (US); Kasey P. Smart, Shrewsbury, MA (US)

(73) Assignee: University of Massachusetts, Boston, MA (US)

( * ) Notice: Subject to any disclaimer, the term of this patent is extended or adjusted under 35 U.S.C. 154(b) by 159 days.

(21) Appl. No.: 15/256,163

(22) Filed: Sep. 2, 2016

(65) Prior Publication Data

US 2017/0070653 A1    Mar. 9, 2017

Related U.S. Application Data

(60) Provisional application No. 62/214,731, filed on Sep. 4, 2015.

(51) Int. Cl.
| | |
|---|---|
| *H04N 5/247* | (2006.01) |
| *G03B 17/56* | (2006.01) |
| *F16M 13/04* | (2006.01) |
| *G03B 29/00* | (2006.01) |
| *H04N 13/282* | (2018.01) |
| *H04N 13/243* | (2018.01) |
| *H04N 5/232* | (2006.01) |
| *H04N 13/189* | (2018.01) |

(52) U.S. Cl.
CPC .......... *H04N 13/282* (2018.05); *H04N 5/247* (2013.01); *H04N 13/243* (2018.05); *H04N 5/23203* (2013.01); *H04N 13/189* (2018.05); *H04N 2213/001* (2013.01)

(58) Field of Classification Search
None
See application file for complete search history.

(56) References Cited

U.S. PATENT DOCUMENTS

| | | | | |
|---|---|---|---|---|
| 4,431,290 | A * | 2/1984 | Kennedy | G01C 11/02 396/182 |
| 2014/0339382 | A1* | 11/2014 | Steubing | F16M 13/04 248/128 |
| 2016/0195798 | A1* | 7/2016 | Nenov | F16M 13/04 348/373 |
| 2017/0026634 | A1* | 1/2017 | Mirlay, Sr. | H04N 13/289 |
| 2017/0070653 | A1* | 3/2017 | Irschick | H04N 5/247 |
| 2018/0191959 | A1* | 7/2018 | Neufeldt | H04N 5/23267 |

* cited by examiner

*Primary Examiner* — William B Perkey
(74) *Attorney, Agent, or Firm* — Schwegman Lundberg & Woessner, P.A.

(57) ABSTRACT

A system includes a user holdable plate or other mounting fixture having multiple attachment points and a plurality of mounting arms coupled to the plate via the attachment points. The mounting arms may be user configurable to support cameras at multiple perspective points about an object to be imaged. A trigger may be coupled to provide a command to the cameras to simultaneously capture an image of the object from the multiple perspective points.

19 Claims, 13 Drawing Sheets

| Single Camera | Full Access | | Half Access | |
|---|---|---|---|---|
| | Time Allowed | Shots Taken | Time Allowed | Shots Taken |
| | 15 Seconds | 11 | 15 Seconds | 11 |
| | 30 Seconds | 24 | 30 Seconds | 22 |
| | 45 Seconds | 31 | 45 Seconds | 33 |
| | | | | |
| Multicamera | 15 Seconds | 40 | | |
| | 27 Seconds | 80 | | |
| | 40 Seconds | 120 | | |

MULTIPLE CAMERA PHOTOGRAMMETRY SYSTEM

RELATED APPLICATION

This application claims priority to U.S. Provisional Application Ser. No. 62/214,731 (entitled Multiple Camera Photogrammetry System, filed Sep. 4, 2015) which is incorporated herein by reference.

BACKGROUND

Photogrammetry is used to create three dimensional (3D) models from two dimensional (2D) images, which can be taken from a simple camera, or a fixed array of cameras. Current photogrammetry methods appear to use rigid and bulky multi-camera systems that involve a set number of cameras in a single configuration.

Many other systems specifically created for photogrammetry use in excess of 18 cameras with some systems using up to 120 cameras and are mostly limited to static, in-studio operations. Multiple camera systems used in photogrammetry typically require the use of multiple media cards, as opposed to a system in which all the images are downloaded simultaneously into a computer device (e.g., a computer table or smartphone), thus allowing the user to access all the images conveniently, either directly through the computer device, or through the media card associated with the computer device.

SUMMARY

A mounting fixture with multiple attachment points and a plurality of mounting arms coupled to the mounting fixture via the attachment points. The mounting arms may be user configurable to support cameras at multiple perspective points about an object to be imaged. A trigger may be coupled to each of the cameras to allow them to simultaneously capture an image of the object from the multiple perspective points.

The images taken by the different cameras are then quickly and simultaneously downloaded into a computer device that may be attached to the triggering system (e.g., a windows tablet, larger computer, smartphone). The computer device may have a removable media drive (e.g., flashdrive, SD card) which the user can conveniently remove, and use in other photogrammetry software. The user may also create 3D models directly on the attached computer tablet, allowing the user to determine if their photogrammetry methods have been successful in real time.

DETAILED DESCRIPTION

Figure 1:
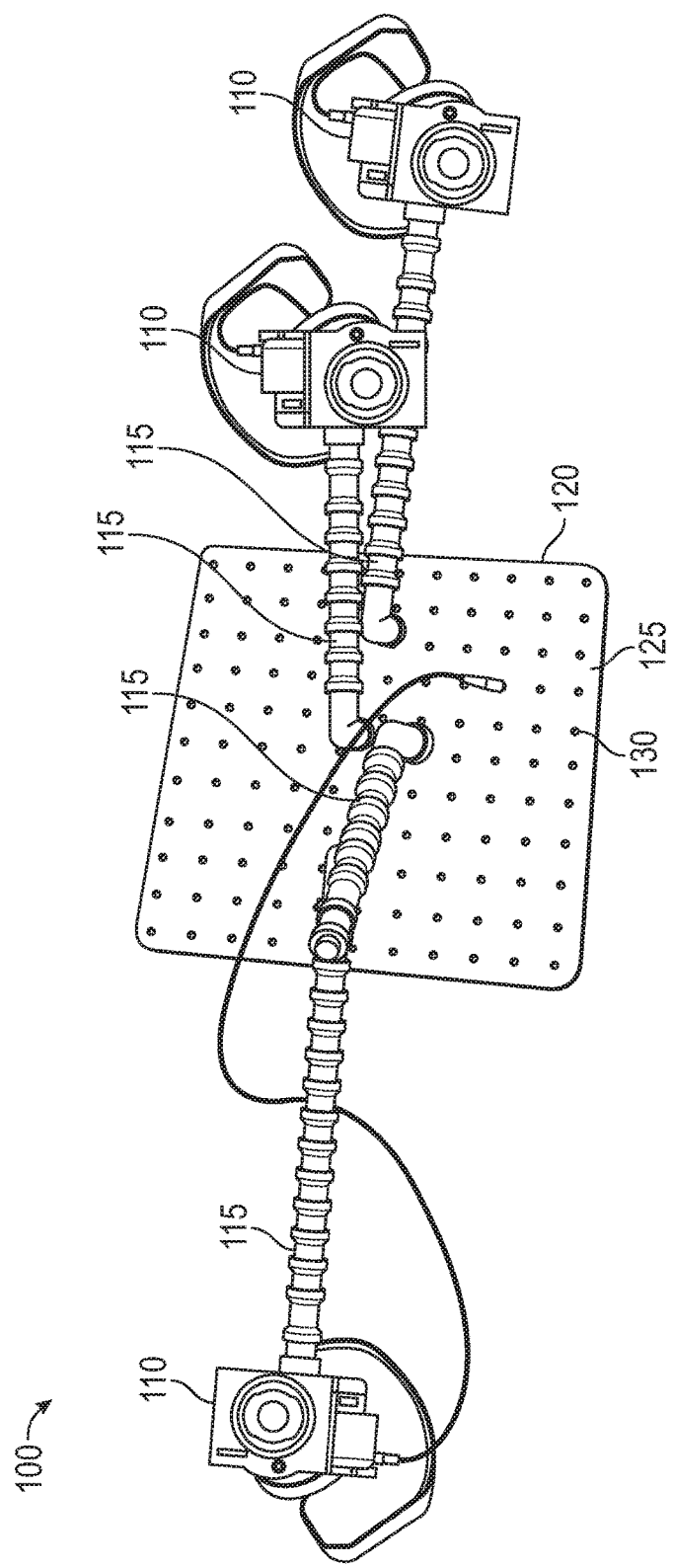
FIG. 1 is a block diagram representation of a hand-held portable photogrammetry system according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

In various embodiments, a portable photogrammetry system may provide ease of use and speed in capturing 3D models and the ability to capture objects in awkward situations (e.g., creating a 3d model of a dangerous object), or in an awkward situation (i.e., the object is difficult to reach). Typical photogrammetry takes place in laboratory or studio environments and is time-consuming (several minutes with a single camera), or involves the use of multiple fixed cameras that are designed to capture images on a still object that is brought into the laboratory or studio environment. The portable photogrammetry system may facilitate rapid capture of objects, allowing its use on live animals landscapes, or humans that don't stay still for several minutes. Typical capture times may be on the order of 15-30 seconds for most human-sized objects, and about 45 seconds to a minute for car-sized objects, with a four-camera setup. If additional cameras are used, the amount of time needed to capture such objects would be decreased significantly.

A portable photogrammetry multi-camera system may also be used to create 3D models from very large areas (e.g., a side of a building). A plurality of flexible mounting arms, such as two or more mounting arms, supported on a mounting fixture and adapted to hold cameras at adjustable perspectives, allow a user of the portable photogrammetry system to capture models of objects from afar that would otherwise be dangerous or inconvenient for the user. The modular mounting arm system allows easy addition and subtraction of cameras. The triggering mechanism allows the cameras to be activated simultaneously, which also speeds up the ability to capture 3D models.

In some embodiments, images from multiple cameras may be downloaded into a single computer device (e.g., computer tablet or smartphone), and this device may have a storage device, such as a media drive or networked cloud storage, allowing the user to conveniently access all photos in a single folder to copy and use in another context (e.g., other photogrammetry software). The computer device may be supported on the mounting fixture with the flexible mounting arms, or may be remotely networked to the cameras, or used to obtain data from storage cards of the camera in various embodiments. Also, the user can create 3D models on the portable computer device to check the efficacy of the model in the field. The 3D models may be created using software currently used with studio based photogrammetry to create 3D models based on the stored images. The portable photogrammetry system may be designed to be portable, and can be easily transported in a bag or case.

The overall multi-camera system can vary greatly in size, ranging from a small mounting fixture (e.g., a frame 15-25 cm for width and length) to very large (e.g., a plate 200-300 cm for width of length). In cases where the mounting fixture is very large, the mounting arms can also vary greatly in length, ranging from short arms (1-3 cm long) to very long (300-500 cm long). The size of the computer device can also vary in size, from a small smartphone (e.g., 5 cm wide×10 cm long), to a very large tablet (e.g., 120-150 cm width).

The cords going from the powered USB hub attaching to the computer device can also vary in length, from several cm to several meters, and the computer device can be positioned on a table or other mount apart from the plate. The cords going from the trigger to the cameras can vary equally in length. Even at large scales, the system can be portable in a large travelling case, or cases, as long as a plate or other mounting fixture is used that can be broken down into several pieces and easily stored. The cameras can vary in size from small cameras several cm in width and height to large DSLR or comparable cameras 20-25 cm long and 10-15 cm high.

Figure 2:
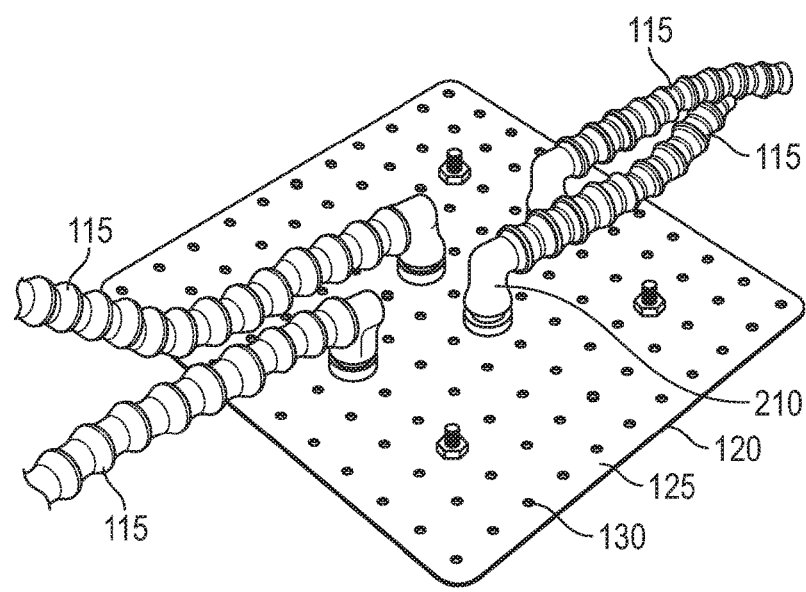
FIG. 2 is a block diagram representation of a hand-held portable photogrammetry system according to an example embodiment.

FIGS. 1 and 2 are block representations of a hand-held portable photogrammetry system 100 that is modular, flexible and easy to use. In various embodiments multiple cameras 110 are attached to movable but stiff mounting arms 115, such as hose-line tubes. The mounting arms should be moveable with a reasonable amount of force that a typical user may generate, yet sufficiently resistant to movement such that the arms support the cameras and do not move without application of force. Hose-line tubes are commercially available and may provide such moveable characteristics. Smaller segments of hose-line or similar flexible material can be used to allow joint movement even at small scales.

The mounting arms 115 may be attached to a first side 120 of a mounting fixture such as a plate 125 that may be made of metal, wood or a stiff composite or plastic. The first side 120 of the plate 125 may include multiple attachment points, also referred to as insertion points 130, such as screw-holes, or through clips, or adhesive materials (e.g., pressure sensitive adhesives or hook and loop [e.g., Velcro® fastener]), so the mounting arms 115 can be moved, and new mounting arms 115 can be added to hold further cameras. The insertion points 130 may be simple holes or other methods of attachment that facilitate the attachment of components to the plate 125.

The mounting arms 115 may also have corresponding attachment devices, such as screws, clips or adhesive material, to attach to the mounting plate, or other mounting fixture as described below. Four mounting arms 115 (Loc-line® modular hose system available from LOCKWOOD PRODUCTS, INC. Lake Oswego, Oreg.) are illustrated as coupled to the plate 125 via a base 210 in the shape of an elbow, and may be adjusted by a user to provide a multiple camera view of an object from multiple different perspectives to facilitate creation of a 3D model of the object that may be used for viewing or 3D printing. The mounting fixture may be a plate in one embodiment that can be of various shapes, including square, circular, rectangular, or curved. The mounting fixture in further embodiments may comprise various sets of brackets or any type of structure that can support multiple flexible mounting arms, such as an 80/20® framing system which can be assembled in many different shapes to provide flexibility in providing different perspective views of an object from a single structure with attached cameras.

The arms may attach to the camera via a standard camera opening that accepts a threaded screw in one embodiment. Other kinds of flexible mounting arms could be composed of various kinds of wood, metal, or composite materials with joints that allow movement, or flexible materials that preserve their shape once altered. In some embodiments, the mounting fixture, mounting arms, and trigger may be provided as a kit for assembly by a user. The trigger may couple to the mounting mixture, or may be a stand-alone wireless trigger to provide a command to the cameras to simultaneously capture an image of the object from the multiple perspective points.

Figure 3:
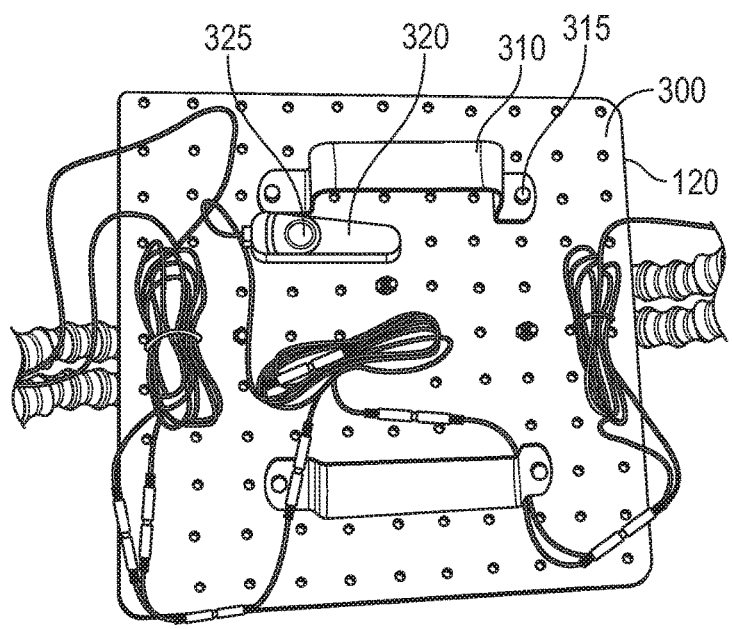
FIG. 3 block representation of a second side of the system of FIGS. 1 and 2 according to an example embodiment.

FIG. 3 is a block representation of a second side 300 of the system 100. One or more handles 310 may be coupled to the second side 300 of the plate 125 to facilitate holding of the plate 125 and hence system 100 by a user. Any type of handle or handles to facilitate a user holding the mounting fixture may be used, or the user may even directly hold a plate type mounting fixture by its edges. One or more screws or other means for coupling or attaching components to the plate 125 are indicated at 315 and may be used to couple the handle 310 to the plate 125 via the one or more insertion points 130.

A trigger mechanism 320 with a user actuatable button 325 may also be provided to activate the cameras simultaneously. The button may be positioned proximate to the handle 310 to provide a convenient position for pushing the button 325 by the user while holding the handle. For instance, the user may grip the handle with multiple fingers, and the button may be positioned to provide ease of use for the thumb to press the button without readjusting or otherwise modifying the grip on the handle. In further embodiments, the trigger and button may be integrated into the handle. Video game controller designs may be used to provide user friendly button positions on the handle in some embodiments.

The trigger mechanism may be coupled to the cameras 110 via wires 140 as also seen in FIG. 1, to cause the cameras to capture images of the object at the same time, or nearly the same time, referred to as simultaneously. The trigger mechanism is configured to create a signal on the wires, or may contain a transceiver and be coupled via Bluetooth, WiFi, or other wireless protocol to transmit image capture commands to the cameras.

The timing of the cameras should be sufficient to minimize adverse effects of motion of the object on processing the images to obtain the 3D model. The length of the wires, or timing of wireless commands from the trigger 320 to capture the image may be equalized in some embodiments. Timers in the cameras may be synchronized, and the wireless command to obtain an image may specify a time at which to take the images in some embodiments. In further embodiments, the difference in time that multiple cameras receive the command is negligible with respect to motion of an object and may be ignored. Commercially available software executing on either the computer device directly, or on a different computer may be used to process the images to generate the 3D model in some embodiments.

Figure 4:
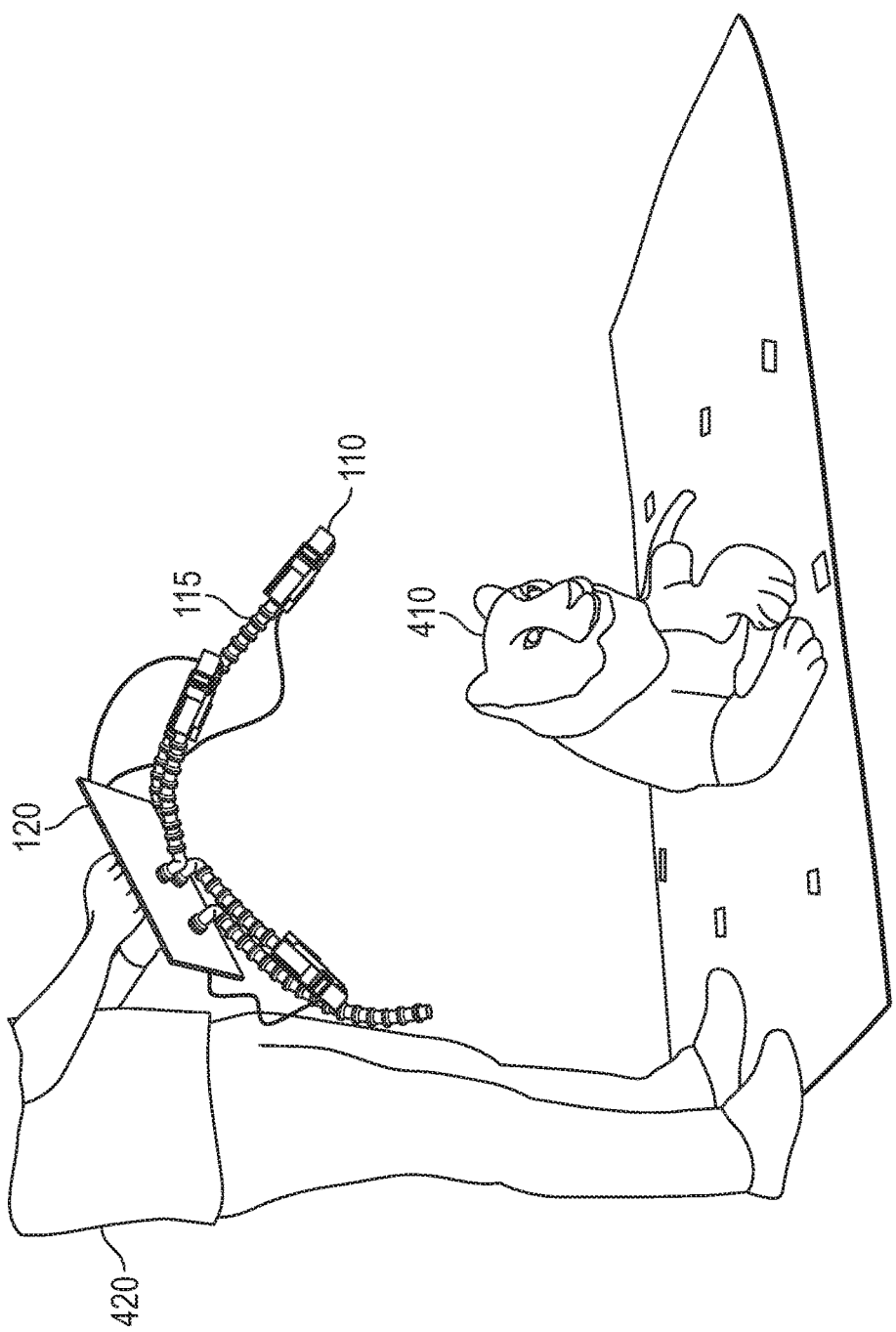
FIG. 4 is a lateral perspective view of hand-held portable photogrammetry system being used to photograph a stuffed model of a four-foot long tiger according to an example embodiment.

FIG. 4 is a lateral perspective view of the system 100 being used to photograph a stuffed model of a four-foot long tiger 410. A user 420 is shown holding the handle with the cameras providing different perspective views of the tiger 410, including different sides of the tiger with a single push of a button on the back side of the plate. Some cameras may also be operated via CHDK (Cannon Hacker's Development Kit), which can modify the firing rate. The wires travel to each camera, but a wireless system could also be used, making these wires unnecessary. The system may also be modified such that the mounting fixture is mounted on a tripod, wheels or some other form of support. The computer device and trigger could then be mounted either on the fixture, or on a separate mount or surface some distance away from the fixture to allow remote access to the camera system. The fixture and its corresponding set of mounting arms and cameras may then be moved around the object, or the arms could be moved around to capture multiple images.

Multiple cameras may be disposed in various arrangements, such as in a row (up-down or left-right), or arranged in an arc like formation extending around a portion of the tiger 410, which is what facilitates capture of multiple perspective images from a single vantage point. With the flexible arms, the arc and resulting camera perspectives may be varied for each model to be captured. It should be noted that the quality of a resulting 3D model rendered by photogrammetry software improves with additional images. The system 100, with the multi-camera perspective and ability to simultaneously capture multiple images of a subject can both help improve the quality of the resulting 3D model as well as reduce the amount of time involved in capturing a desired number of images from different perspectives.

In some embodiments, any other type of arm structure or means of holding cameras may be used that can be coupled to a support structure on one end and support a camera at another end such that the system provides a multiple perspective view of an object to be imaged for creation of a 3D models of the object.

In one embodiment, the arms may be flexible arms that can be flexed and shaped to hold a camera at a desired angle relative to the plate and hold the position of the camera. In a further embodiment, the arms may be fixed in multiple different shapes and different arms may be selected to provide desired camera positions. Flexible arms provide an easy way to configure the cameras for different types and sizes of objects. Portions of the arms may telescope in some embodiments to provide even greater flexibility of camera positioning.

The mounting fixture can be flat or curved in various embodiments and can have holes or other attachment points for attaching the mounting arms to the plate or other mounting fixture. Any means of securing the arm to the mounting fixture may be used in various embodiments to provide a multiple perspective view of the object being imaged from one vantage point.

When used with single cameras, photogrammetry is often relatively slow (minutes), which is prohibitive for many objects that move on shorter time scales (seconds), such as live animals, humans, and other objects that move (e.g., trees exposed to wind). Further, when a large area (e.g., side of a building, automobile) is being reconstructed, these slow times make the creation of 3D models prohibitive. The combination of multiple cameras with movable mounting arms, the ability to add new cameras in a modular fashion, the triggering system, the ability to download all images into a computer device, and the sturdy and simple build, all allow one to capture and process images quickly for 3D model creation.

Current photogrammetry systems are not typically usable in outdoor conditions due to their lack of portability, or their inability to be used in awkward situations (e.g., on a boat platform). For example, current methods do not enable capture of objects that could be dangerous or are situated away from the photographer. The embodiments described herein provide a portable and movable mounting arm system supporting cameras that overcome this challenge. 3D modeling is emerging, along with 3D printing, as a viable commodity available to consumers, because of recent advances in both software and hardware. The portable photogrammetry system facilitates this transition to a viable commodity by creation of a portable and rapid 3D motion capture system.

Even at large scales (e.g., mounting fixtures and mounting arms more than 1 meter long), the system is portable, as each component can be removed and then placed in carrying cases of various sizes. The portable photogrammetry system 100 may be used by laypeople for capturing images of everyday objects important to them, such as friends, pets, landscapes, everyday objects, etc. Further, the system allows one to create a portable photogrammetry "studio" in which the mounting fixture and corresponding mounting arms are arranged on a tripod or other form of support in an outdoor or indoor venue. The portable photogrammetry system 100 may be of great value for companies, agencies, and individuals that desire to obtain 3D views of a space or objects. Example uses include obtaining 3D views of crime scenes, buildings, museum pieces, artifacts, art, virtual tours, virtual reality, video game design, forests, and landscapes, among others. The portable photogrammetry system 100 may also be used by professors and universities to create 30 teaching models, with the portable nature of the system facilitating use both in the field and in classrooms or workshops. In the case of artifacts and other small items, the arms may be used to position the cameras to obtain images from multiple sides of the items with a single actuation of the trigger. For other artifacts, the system may be moved to multiple different positions, capturing images at each position to obtain sufficient images to generate the desired 3D model.

Several images of an alternative mounting fixture 500 with flexible arms 505, 510, 515, and 520 having multiple cameras 525, 530, 535, and 540, multiple handles 543 and 545, and a tablet computer 548 are illustrated in FIGS. 5A, 5B, 5C, 5D, 5E, 5F, and 5G. The handles may be curved in a wheel like shape or otherwise shaped based on ergonomic factors or otherwise to facilitate holding by a user. One, or more handles may be provided in various embodiments.

Figure 5A:
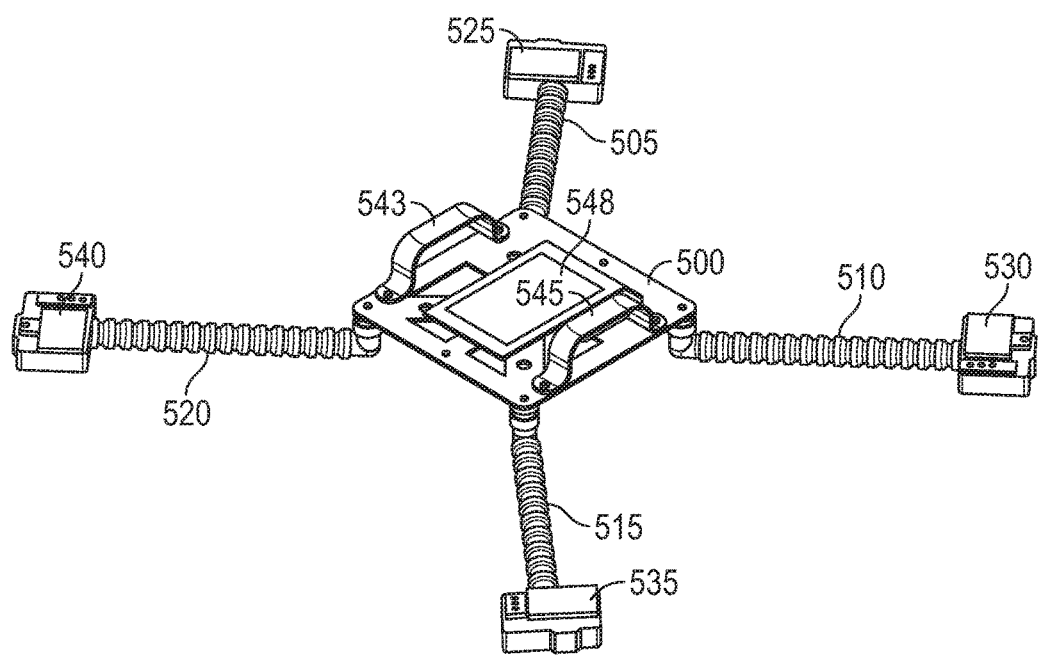
FIGS. 5A, 5B, 5C, 5D, 5E, 5F, 5G, and 5H are representations of an alternative mounting fixture with flexible arms having multiple cameras, multiple handles, and a tablet computer according to an example embodiment.
Figure 5B:
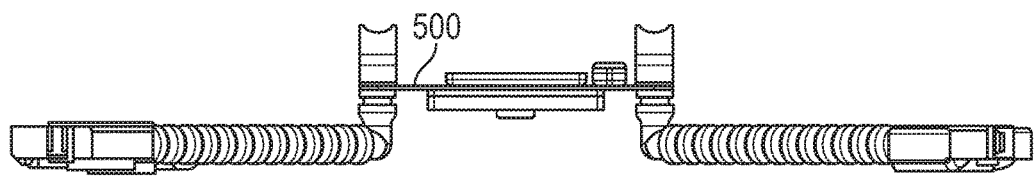
Figure 5C:
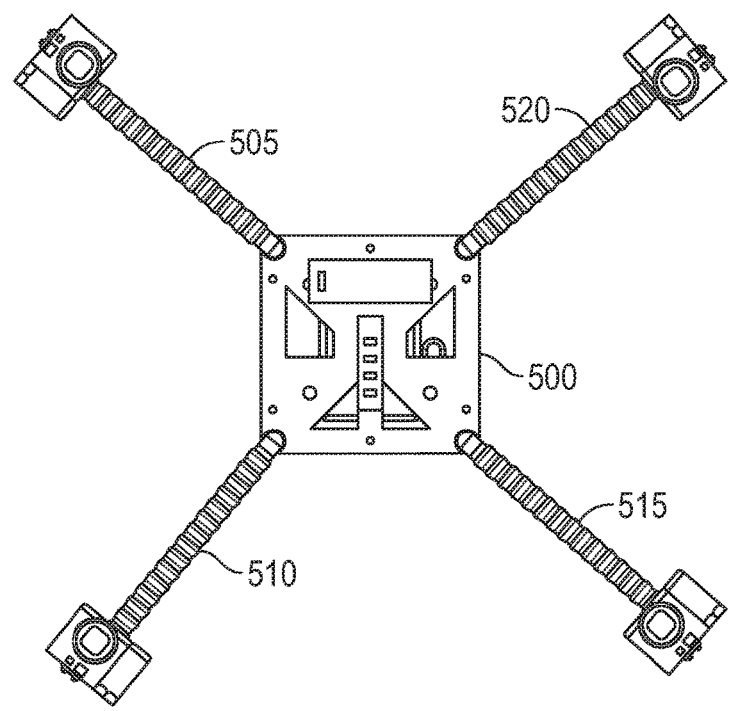
Figure 5D:
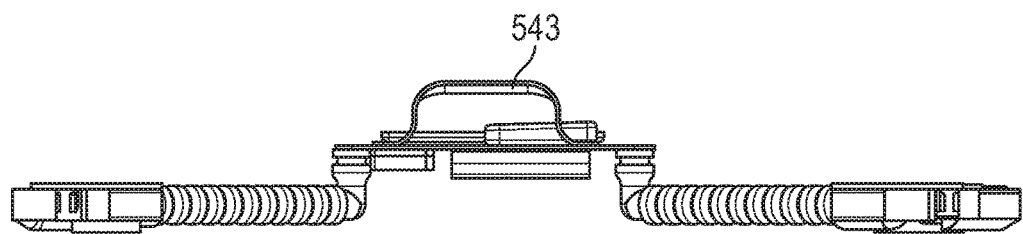
Figure 5E:
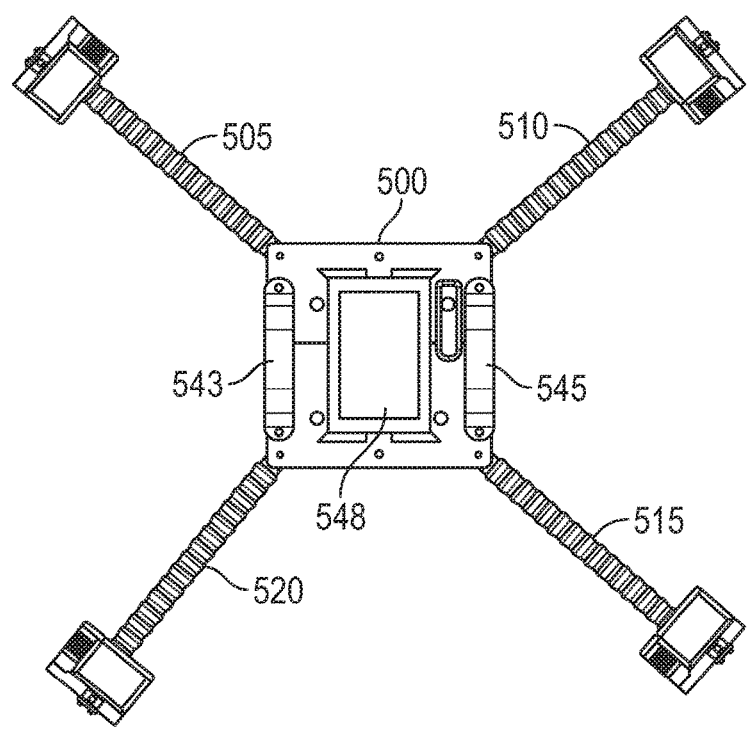
Figure 5F:
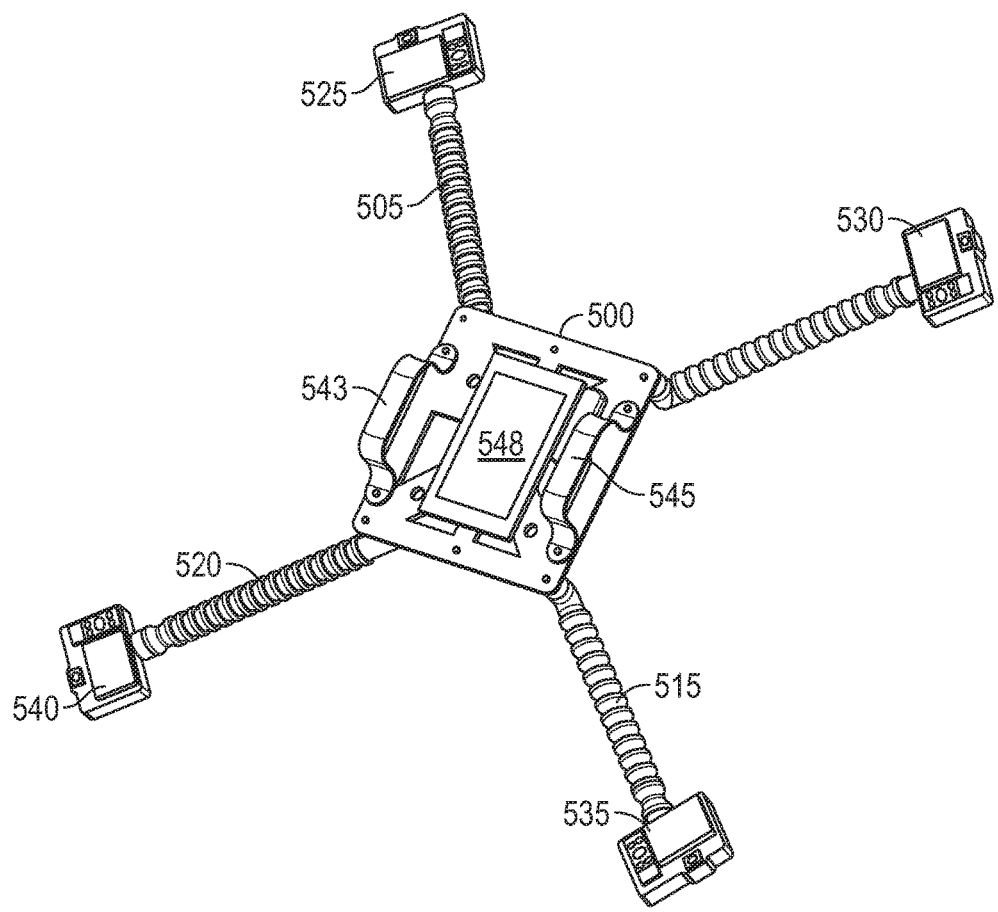
Figure 5G:
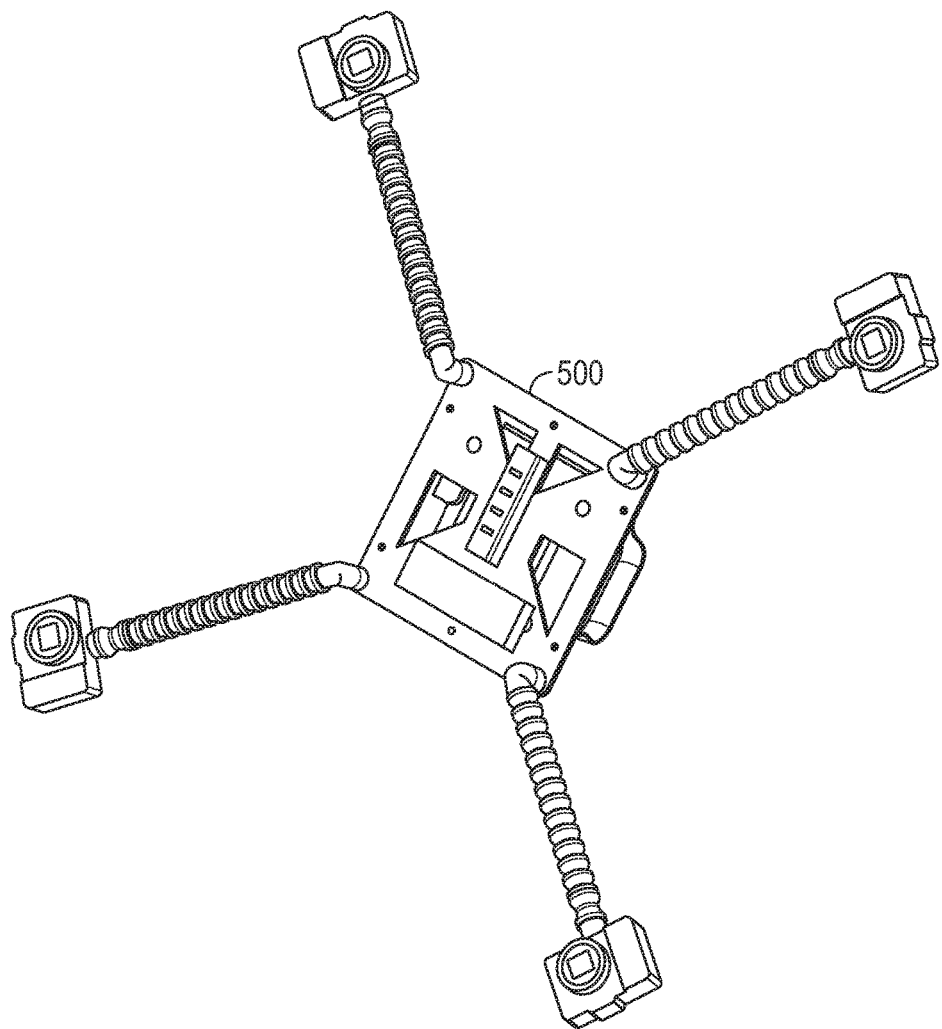
Figure 5H:
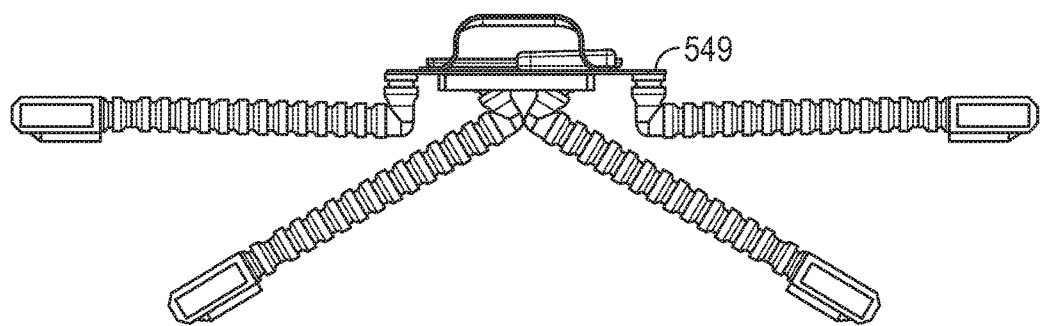

A further alternative mounting fixture is illustrated 549 in FIG. 5H showing different attachment points and an alternative arrangement of components.

Figure 5I:
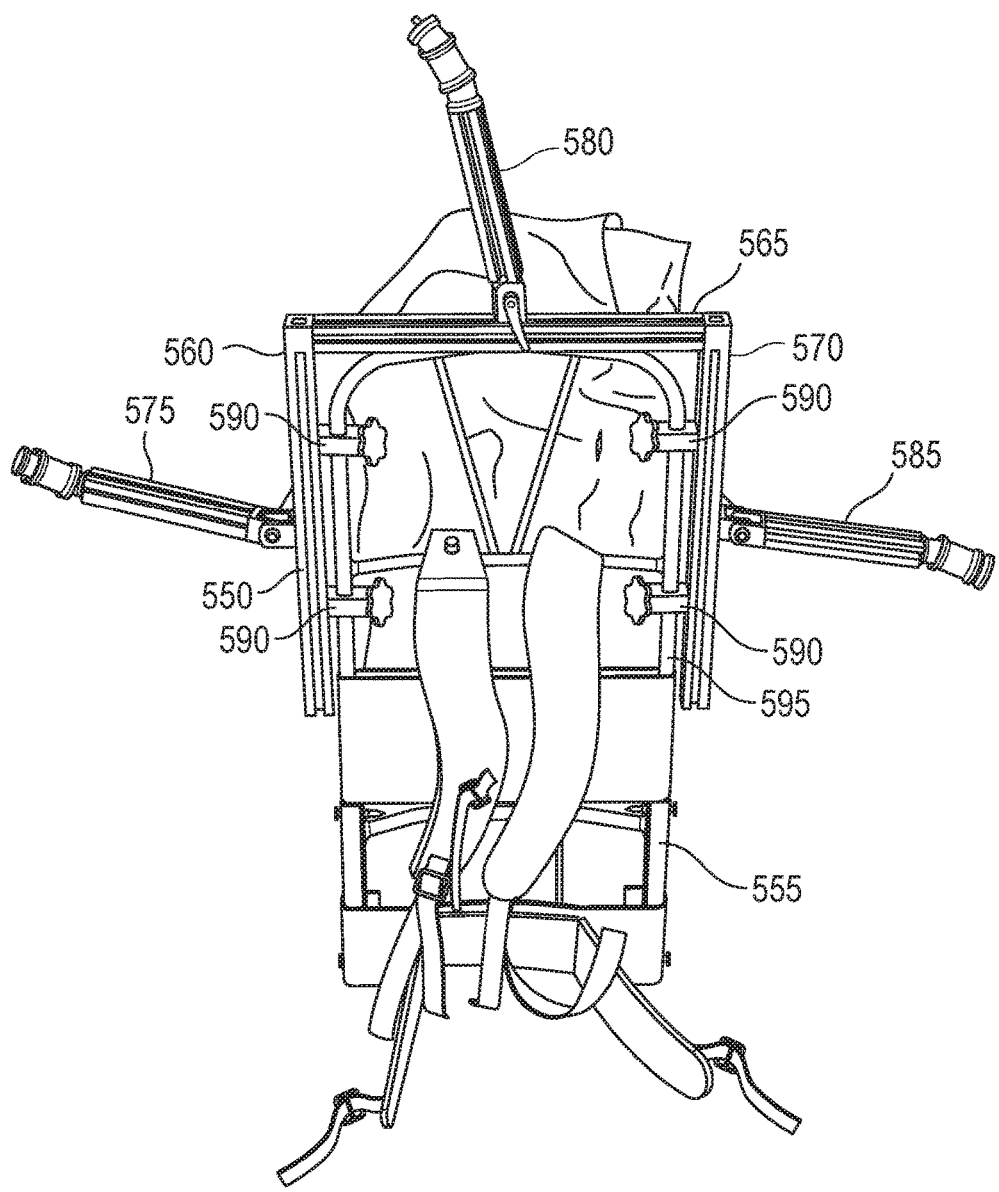
FIG. 5I is perspective view of a frame based mounting fixture coupled to a backpack according to an example embodiment.

FIG. 5I is perspective view of a frame based user holdable mounting fixture 550 coupled to a backpack 555 according to an example embodiment. The mounting fixture 550 comprises three support structures 560, 565, and 570 coupled in a "U" shape, or open rectangle shape. The support structures may be configured with attachment points such that each may support one or more flexible arms with cameras indicated at 575, 580, and 585. More or fewer flexible arms may be provided in further embodiments. Clamps 590 or other means, such as welding or screws may be used for coupling and supporting the support structures to a backpack frame 595. In one embodiment, the mounting fixture 550 is configured to fit around the backpack frame 595, allowing the frame to be worn by a user with or without an optional pack. The flexible arms with cameras may extend beyond the frame, with the cameras pointable to provide imaging of a subject from multiple perspectives while the backpack is being worn by a user. The trigger for the cameras may be held by a user and coupled via wire or wireless connection to trigger capture of images by the cameras, allowing a user to walk about a subject and capture sufficient images to form a 3D model of the subject, all while still wearing the backpack.

In some embodiments, the arms may be made of pieces of 80/20 T-slotted aluminum extrusion framing elements with movable joints at the ends near the camera (end of arms). The 80/20 elements can pivot 180 degrees (side to side) on the backpack, which may be built into the frame of a standard backpack which is user holdable, such as by wearing the backpack using straps and belt attached to the frame. The system has utility in at least the creation of 3D models of habitats.

Figures 6, 7:
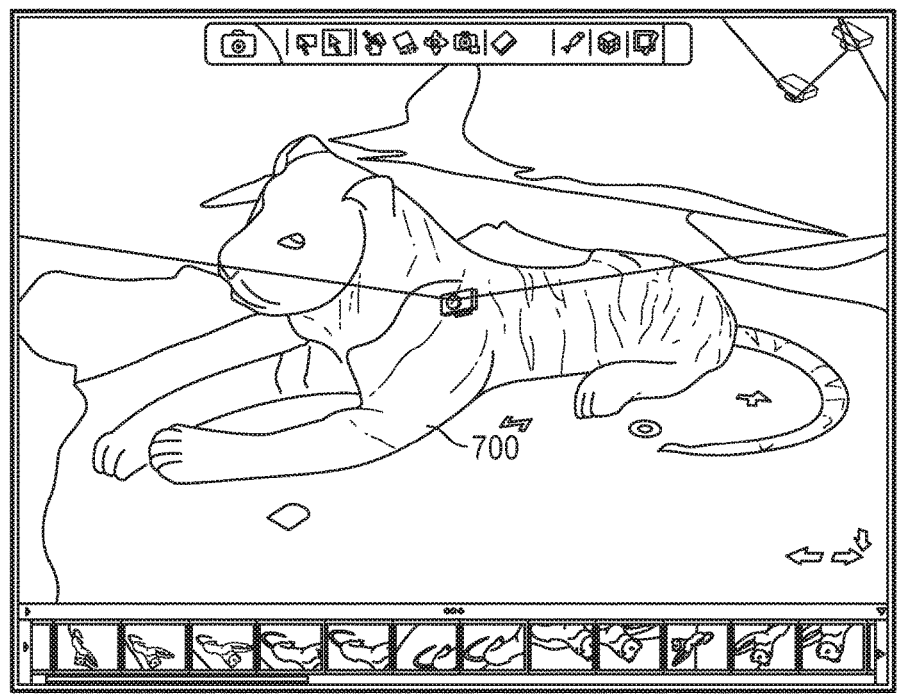
FIG. 6 is a table illustrating some example times that may be typical of capturing different subjects with either a single camera or multiple cameras according to an example embodiment.
FIG. 7 is an illustration of a model created from photographs taken with full access by a multi-camera system having a 4-camera configuration according to an example embodiment.

FIG. 6 is a table 500 illustrating some example times that may be typical of capturing different subjects with either a single camera, multiple cameras (in this case, 4 cameras) provided by system 100, full access to the subject, or only half access. The number of images taken is generally proportional to model quality in multi-camera system versus a single camera system. The number of images corresponds to each camera firing about 1 shot per second, for 10 shots continuously. The number of images (shots) obtained from the system 100, referred to as a multi-camera system in FIG. 6, illustrate that many more images may be captured resulting in the ability to generate a higher quality 3D model. As the multi-camera system can have as little as two cameras, and as many as about 60, the number of images gathered per unit time will vary, but will always be greater than a single camera system.

Some examples of images of resulting models are illustrated when using both single camera for various lengths of time and a multi-camera system corresponding to the presently described example embodiments. The multi-camera system comprised a 4-camera configuration. The term "full access" corresponds to the ability of an individual with the multi-camera system being free to move about the object being photographed. The term "half-access" corresponds to the ability of an individual being limited to stay on one side of the object being photographed.

Where there is no time limit, sufficient images to create reasonable models of the object, in the case the tiger referred to previously, were obtained with full access in about 45 seconds using a multi-camera system. The time to collect sufficient images having full access with a single camera took about 2.75 minutes.

Figure 8:
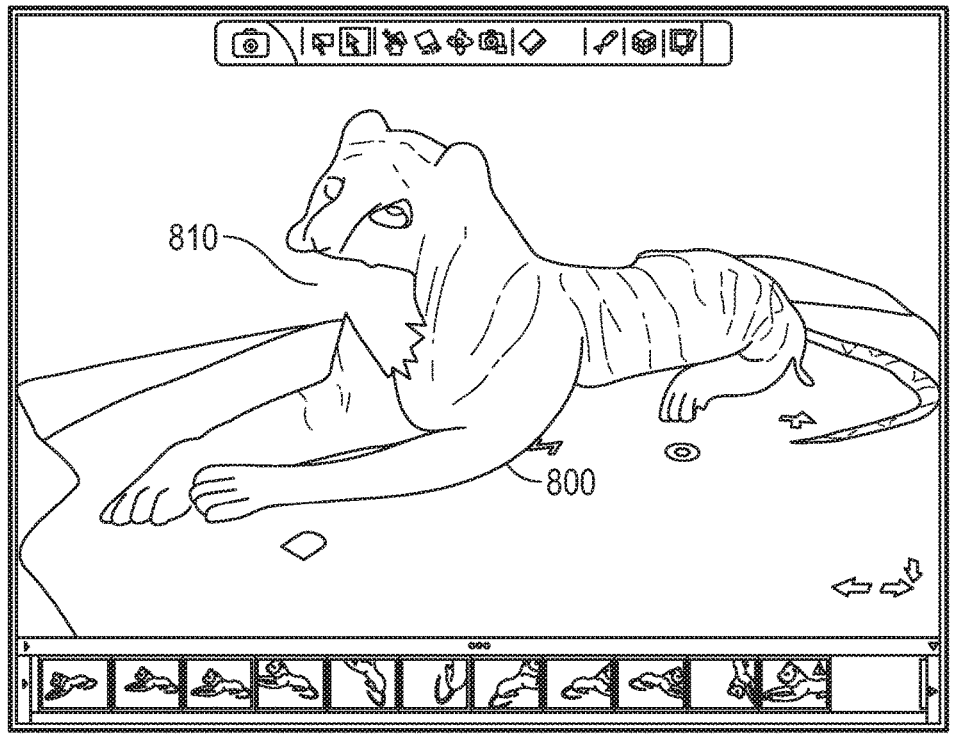
FIG. 8 is an illustration of a model created from photographs taken with full access by a single camera system.

FIG. 7 is an illustration of a model 700 created from photographs taken with full access by a multi-camera system having a 4-camera configuration. The model 700 is substantially complete. FIG. 8 is an illustration of a model 800 created from photographs taken with full access by a single camera system. Model 800 has a large gap 810 under the mouth of the tiger where there were insufficient pictures to obtain adequate resolution. The model 700, taken in the same amount of time with the multi-camera system is much more complete and accurate. Similar gaps exist in the single camera trials when the user only had half access to the tiger.

Figure 9:
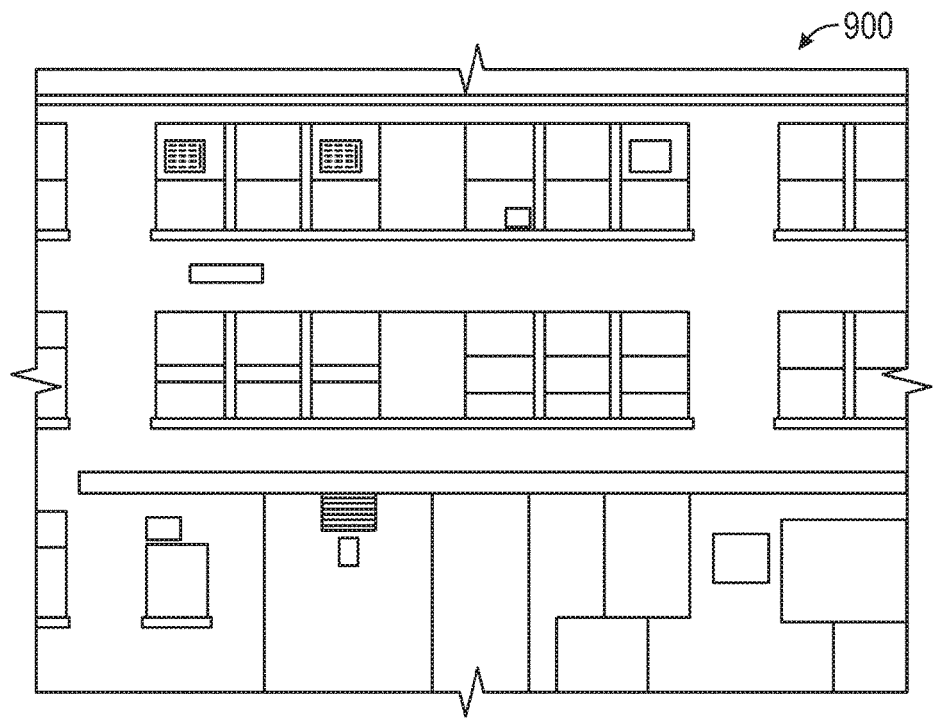
FIG. 9 is a representation of model of a building segment that was obtain in 45 seconds via a similar multi-camera system according to an example embodiment.

FIG. 9 is a representation of a model of a building segment 900 that was obtain in 45 seconds via a similar multi-camera system. The segment 900 is an example of an architectural design or reconstruction of the segment 900 having dimensions of roughly 52.5 feet wide by 37.5 feet high in the representation, corresponding to a frame.

Figure 10:
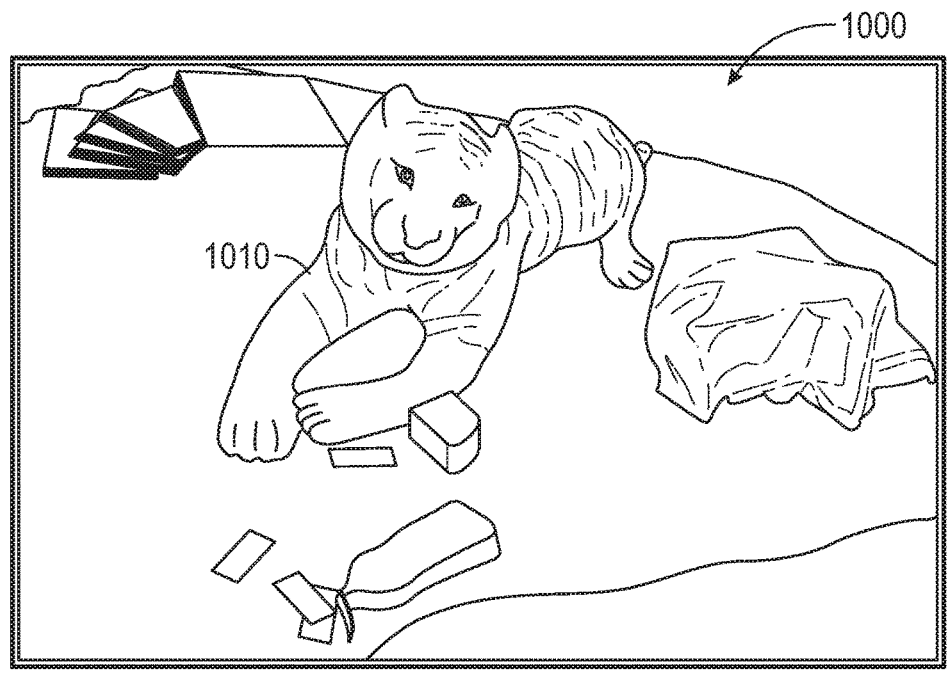
FIG. 10 is a representation of a staged crime scene that includes the tiger 1010 and various objects which may or may not have been used in the commission of the crime according to an example embodiment.

FIG. 10 is a representation of a model of a staged crime scene 1000 that includes the tiger 1010 and various objects which may or may not have been used in the commission of the crime. A model may be created to allow a user to see a three dimensional view of the crime scene. The photographs may be obtained in a fairly short amount of time, such as 1 minute, using the multi-camera system.

Figure 11:
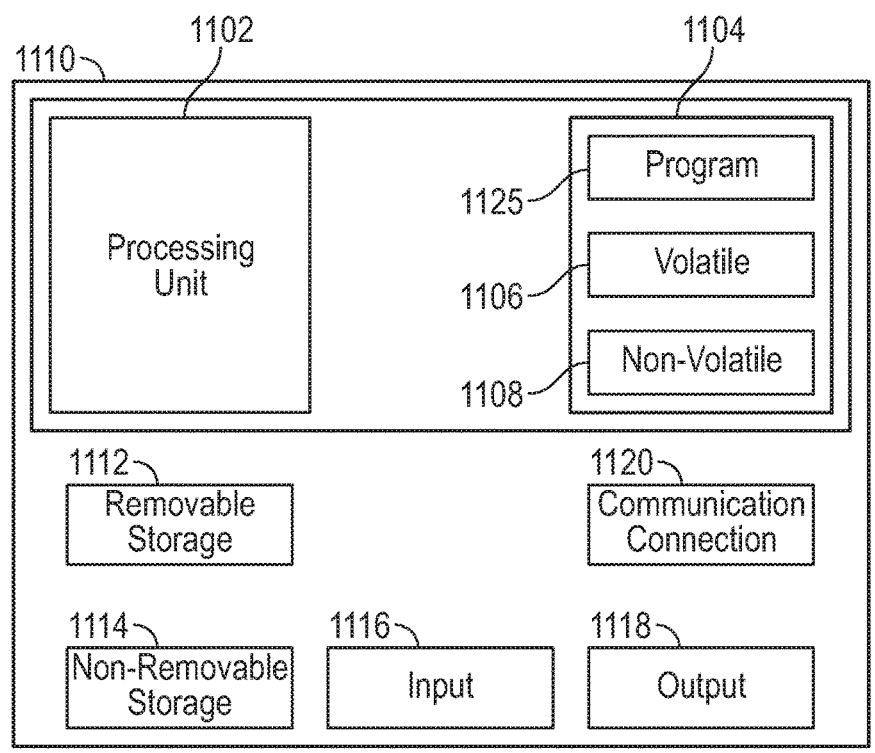
FIG. 11 is a block schematic diagram of a computer system configurable to implement methods and execute available software to both receive images from the cameras and process the images to generate a 3D model according to an example embodiment.

FIG. 11 is a block schematic diagram of a computer system 1100 to implement methods and execute available software to both receive images from the cameras and process the images to generate the 3D model in some embodiments. The system 1100 may be further configured to trigger the multiple cameras to take images substantially simultaneously in further embodiments. Substantially simultaneously in some embodiments may include images taken over a period of time that is sufficient to capture images of a subject that is moving. The time period may be small when the subject is moving quickly such that all the images are taken within a time where the subject has moved very little in order to create an accurate model. If the image is not moving, the time within which the images are taken may be longer.

In some embodiments, the images may be time stamped, allowing the software to correlate images of a moving object in time and more accurately generate the model. Images may also be correlated based on time of receipt, in which all images corresponding to a single button actuation are assumed to be received sequentially from the multiple cameras. All components need not be used in various embodiments. One example computing device in the form of a computer 1100, may include a processing unit 1102, memory 1103, removable storage 1110, and non-removable storage 1112. Although the example computing device is illustrated and described as computer 1100, the computing device may be in different forms in different embodiments. For example, the computing device may instead be a smartphone, a tablet, smartwatch, or other computer device including the same or similar elements as illustrated and described with regard to FIG. 11. Devices such as smartphones, tablets, and smartwatches are generally collectively referred to as mobile devices. Further, although the various data storage elements are illustrated as part of the computer 1100, the storage may also or alternatively include cloud-based storage accessible via a network, such as the Internet.

Memory 1103 may include volatile memory 1114 and non-volatile memory 1108. Computer 1100 may include—or have access to a computing environment that includes—a variety of computer-readable media, such as volatile memory 1114 and non-volatile memory 1108, removable storage 1110 and non-removable storage 1112. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

Computer 1100 may include or have access to a computing environment that includes input 1106, output 1104, and a communication connection 1116. Output 1104 may include a display device, such as a touchscreen, that also may serve as an input device. The input 1106 may include one or more of a touchscreen, touchpad, mouse, keyboard, camera, one or more device-specific buttons, one or more sensors integrated within or coupled via wired or wireless data connections to the computer 1100, and other input devices. The computer may operate in a networked environment using a communication connection to connect to one or more remote computers, such as database servers, including cloud based servers and storage. The remote computer may include a personal computer (PC), server, router, network PC, a peer device or other common network node, or the like. The communication connection may include a Local Area Network (LAN), a Wide Area Network (WAN), cellular, WiFi, Bluetooth, or other networks. In one embodiment, the cameras 110 may be wirelessly coupled via the communication connection to transfer captured images and initiate the software to perform the generation of the 3D model. The 3D model may be displayed on display screen 1104 or sent to a 3D printer coupled to computer 1100 for creating a three dimensional printout of the object.

Computer-readable instructions stored on a computer-readable storage device are executable by the processing unit 1102 of the computer 1100. A hard drive, CD-ROM, and RAM are some examples of articles including a non-transitory computer-readable medium such as a storage device. The terms computer-readable medium and storage device do not include carrier waves. For example, a computer program 1118 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 1100 to provide generic access controls in a COM based computer network system having multiple users and servers.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A system comprising:
    a user holdable mounting fixture having multiple attachment points, wherein the user holdable mounting fixture comprises three support structures configured to couple to a backpack frame;
    a plurality of mounting arms coupled to the mounting fixture via the attachment points, the mounting arms being user configurable to support cameras at multiple perspective points about an object to be imaged; and
    a trigger coupled to provide a command to the cameras to substantially simultaneously capture an image of the object from the multiple perspective points without moving the mounting fixture,
    wherein the user holdable mounting fixture comprises three support structures configured to couple to a backpack frame.

2. The system of claim 1 wherein the trigger is coupled to each camera via a wire.

3. The system of claim 1 wherein the trigger is wirelessly coupled to each camera.

4. The system of claim 1 wherein the arms are flexible and movable to the multiple perspective points about the object.

5. The system of claim 4 wherein the arms comprise hose-line tubes.

6. The system of claim 1 wherein the mounting fixture comprises a plate, the attachment points are holes in the plate, and the arms are coupled to the holes.

7. The system of claim 1 wherein the attachment points comprise snap fit connectors.

8. The system of claim 6 and further comprising a handle attached to the plate proximate to the trigger.

9. The system of claim 1 and further comprising multiple cameras coupled to the arms at corresponding multiple perspective points.

10. The system of claim 9 wherein the cameras are coupled to a computer to provide captured images of the object to the computer, wherein the computer is programmed to execute code to generate a three dimensional representation of the object as a function of the provided captured images.

11. The system of claim 9 and further comprising a portable computer device connected to the cameras, to download images from the cameras, the portable computer device coupled to a storage device to store the images and provide access to the images.

12. The system of claim 1 wherein the three support structures are coupled to each other in an open rectangular shape, and wherein each support structure is configured to support one or more of the flexible arms.

13. A kit comprising:
    a user holdable mounting fixture having multiple attachment points, wherein the user holdable mounting fixture comprises three support structures configured to couple to a backpack frame;
    a plurality of mounting arms configured to couple to the mounting fixture via the attachment points, the mounting arms being user configurable to support cameras at multiple perspective points about an object to be imaged; and
    a trigger configurable to provide a command to the cameras to simultaneously capture an image of the object from the multiple perspective points.

14. The kit of claim 13 and further comprising multiple cameras to couple to the mounting arms at the multiple perspective points.

15. The kit of claim 14 and further comprising a computer system, portable or otherwise, to receive images from the cameras and execute code to generate a three dimensional model of the object.

16. The kit of claim 13 wherein the three support structures are coupled to each other in an open rectangular shape configured to couple to a backpack frame, wherein each support structure is configured to support one or more of the flexible arms.

17. A method comprising:
   positioning multiple cameras to provide multiple perspective views of an object to be imaged by the cameras, the cameras being supported by multiple respective flexible arms coupled to a mounting fixture with a trigger coupled to provide commands to the multiple cameras, wherein the multiple flexible arms comprise three support structures configured to couple to a backpack frame;
   holding the mounting fixture at a vantage point with respect to the object; and
   triggering the cameras to each simultaneously capture an image from their respective perspectives.

18. The method of claim 17 and further comprising providing the captured images to a programmed computer to generate a three dimensional representation of the object.

19. The method of claim 17 and further comprising capturing multiple perspective view images from additional vantage points about the object.

* * * * *